(12) United States Patent
Kusunose

(10) Patent No.: US 7,342,694 B2
(45) Date of Patent: Mar. 11, 2008

(54) IMAGE READING DEVICE

(75) Inventor: Noboru Kusunose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 973 days.

(21) Appl. No.: 10/348,774

(22) Filed: Jan. 23, 2003

(65) Prior Publication Data

US 2003/0161012 A1    Aug. 28, 2003

(30) Foreign Application Priority Data

Jan. 24, 2002 (JP) ............................. 2002-015017
Dec. 27, 2002 (JP) ............................. 2002-380291

(51) Int. Cl.
*H04N 1/04* (2006.01)
*H04N 1/00* (2006.01)

(52) U.S. Cl. .................. 358/498; 358/496; 358/497; 358/401

(58) Field of Classification Search ............ 358/498, 358/496, 497, 401, 487; 399/367
See application file for complete search history.

(56) References Cited

U.S. PATENT DOCUMENTS

| | | | |
|---|---|---|---|
| 5,557,382 A | 9/1996 | Tatsumi et al. | |
| 5,765,079 A | 6/1998 | Yoshiki et al. | |
| 5,828,935 A | 10/1998 | Tatsumi et al. | |
| 5,909,610 A | 6/1999 | Yoshiki et al. | |
| 6,089,567 A * | 7/2000 | Yatsuhashi et al. | 271/314 |
| 6,118,951 A | 9/2000 | Kato et al. | |
| 6,209,864 B1 * | 4/2001 | Taniguchi et al. | 271/220 |
| 6,389,251 B2 | 5/2002 | Kusunose | |
| 6,618,575 B2 * | 9/2003 | Takida et al. | 399/367 |
| 6,738,167 B1 * | 5/2004 | Suzuki | 358/498 |

FOREIGN PATENT DOCUMENTS

JP    2000-351482    12/2000

* cited by examiner

*Primary Examiner*—Houshang Safaipour
(74) *Attorney, Agent, or Firm*—Oblon, Spivak, McClelland, Maier & Neustadt, P.C.

(57) ABSTRACT

An image reading device for reading a document while conveying it of the present invention includes a reading member for reading the document, a path positioned downstream of the reading member in a direction of document conveyance such that the document moving away from the reading member is conveyed along the path, and a pair of rollers positioned on the path for conveying the document and having a nip positioned above the top of the reading member. An auxiliary sheet member is positioned on the path between the reading member and the pair of rollers for helping the document be conveyed. One end of the auxiliary sheet member is affixed to the path adjacent to the reading member at a position lower than the top of the reading member while the other end is held in contact with part of the pair of rollers around the nip.

16 Claims, 11 Drawing Sheets ize reading device and more
particularly to an image reading device including a sheet-
IMAGE READING DEVICE

BACKGROUND OF THE INVENTION

1. Field of the Invention

The present invention relates to a copier, facsimile apparatus, scanner or similar image reading device and more particularly to an image reading device including a sheet-through type of document conveying mechanism.

2. Description of the Background Art

There is an increasing demand for an image reading device operable at higher speed, having more functions, and occupying a less space. To meet this demand, an ADF (Automatic Document Feeder) or similar document conveying device included in the image reading device should be provided with a space-saving configuration. A sheet-through type of document conveying mechanism known in the art saves space to occupy by conveying a document paid out from a feed tray to a reading position via a preselected path while turning it and continuously conveying, after the document has been read by a contact type of image sensor, the document to a discharge tray. However, the conventional sheet-through type of document conveying mechanism is apt to bring about various problems including a jam, the bending of the leading edge portion of a document, and defective reading, as will be described specifically later.

Technologies relating to the present invention are disclosed in, e.g., Japanese Patent Laid-Open Publication No. 2000-351482.

SUMMARY OF THE INVENTION

It is an object of the present invention to provide an image reading device capable of solving the problems stated above and obviating defective reading including jitter.

An image reading device for reading a document while conveying it of the present invention includes a reading member for reading the document, a path positioned downstream of the reading member in a direction of document conveyance such that the document moving away from the reading member is conveyed along the path, and a pair of rollers positioned on the path for conveying the document and having a nip positioned above the top of the reading member. An auxiliary sheet member is positioned on the path between the reading member and the pair of rollers for helping the document be conveyed. One end of the auxiliary sheet member is affixed to the path adjacent the reading member at a position lower than the top of the reading member while the other end is held in contact with part of the pair of rollers around the nip.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
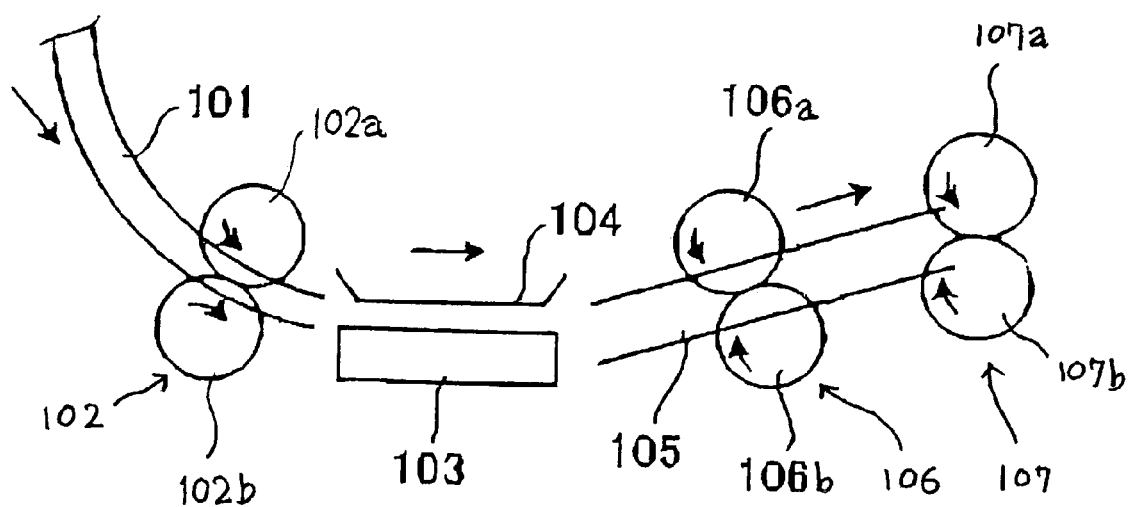
FIG. 1 is a fragmentary front view showing a conventional conveying mechanism included in an image reading device.

To better understand the present invention, brief reference will be made to the conventional sheet-through type of document conveying mechanism included in an image reading device and briefly described previously. As shown, a document paid out from a feed tray, not shown, is brought to a pair of rollers 102a and 102b via a curved path 101 extending from the feed tray. The rollers 102a and 102b convey the document to a reading position where a contact type of image sensor 103 and a shading correcting member or white reference plate 104 are located. Subsequently, the document moving away from the reading position is sequentially nipped by a pair of rollers 106a and 106 and a pair of rollers 107a and 107b via an upwardly inclined path 105 and conveyed to a discharge tray, not shown, thereby.

In the above configuration, the document is passed through a space between the shading correcting place 104 and the image sensor 103 facing each other. The space between the shading correcting plate 104 and the image sensor 103 is selected to be narrow enough to prevent the document from rising. Such a space, however, increases frictional resistance between the document and the image sensor 103, making it difficult to convey a soft document. To cope with a soft document, the rollers 106a and 106b are positioned downstream of the image sensor 103 in the direction of conveyance in order to increase a conveying force, depending on the length of the path 105 between the image sensor 103 and the rollers 107a and 107b.

The path 105 is inclined upward away from the image sensor 103, so that the nip of the rollers 106a and 106b is positioned above the top of the image sensor 103. This is apt to bring about a problem that the document fails to reach the nip of the rollers 106a and 106b and jams the path 105 or that the leading edge of the document hits against the roller 106b positioned below the roller 106a and then reaches the nip of the rollers 106a and 106b in a bent position. Further, when the leading edge of the document hits against the roller 106b, the conveyance of the document stops for a moment due to the resulting shock, causing jitter or similar defective reading to occur.

Figure 2:
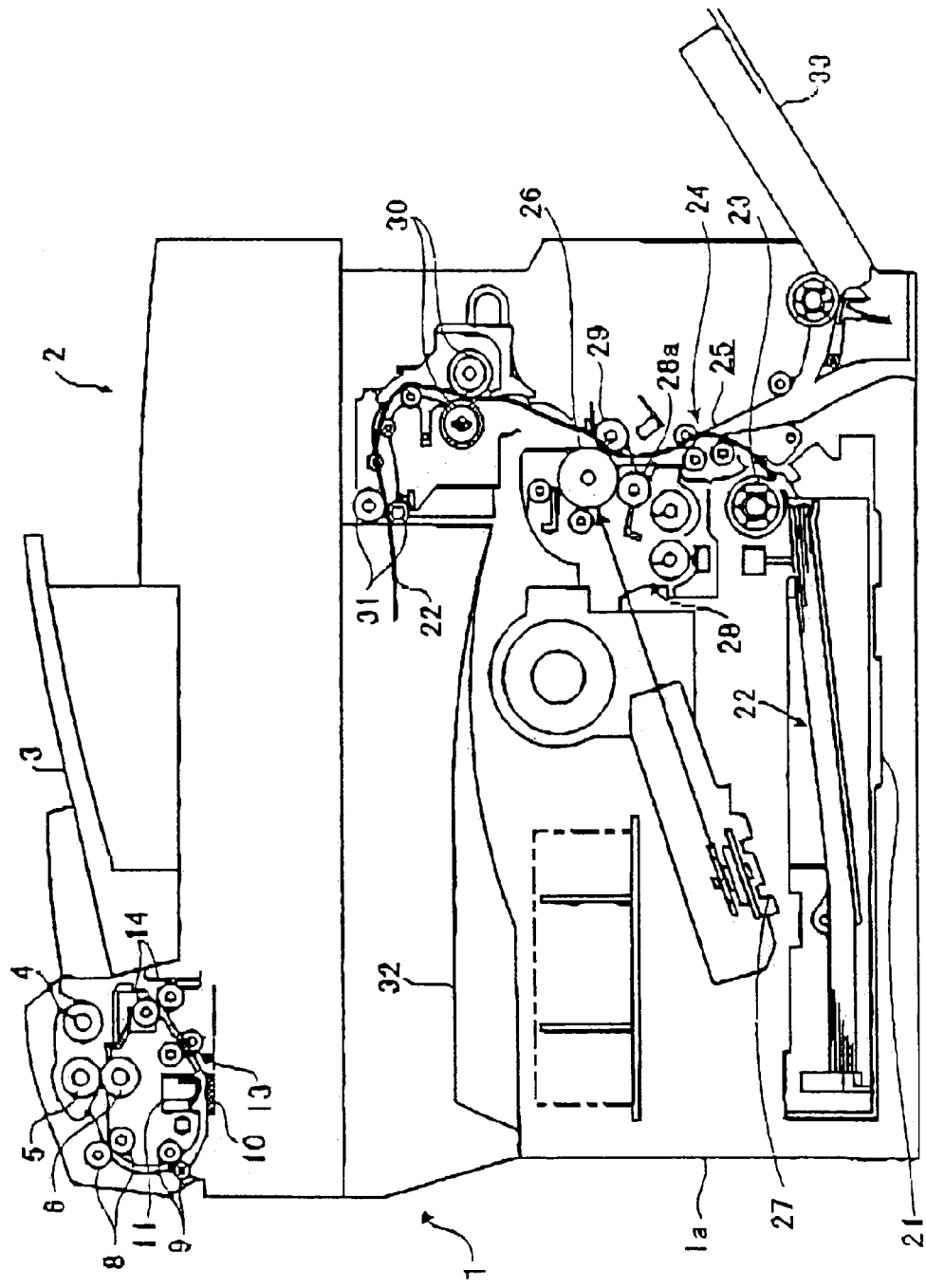
FIG. 2 is a front view showing an image reading device embodying the present invention.
Figure 3:
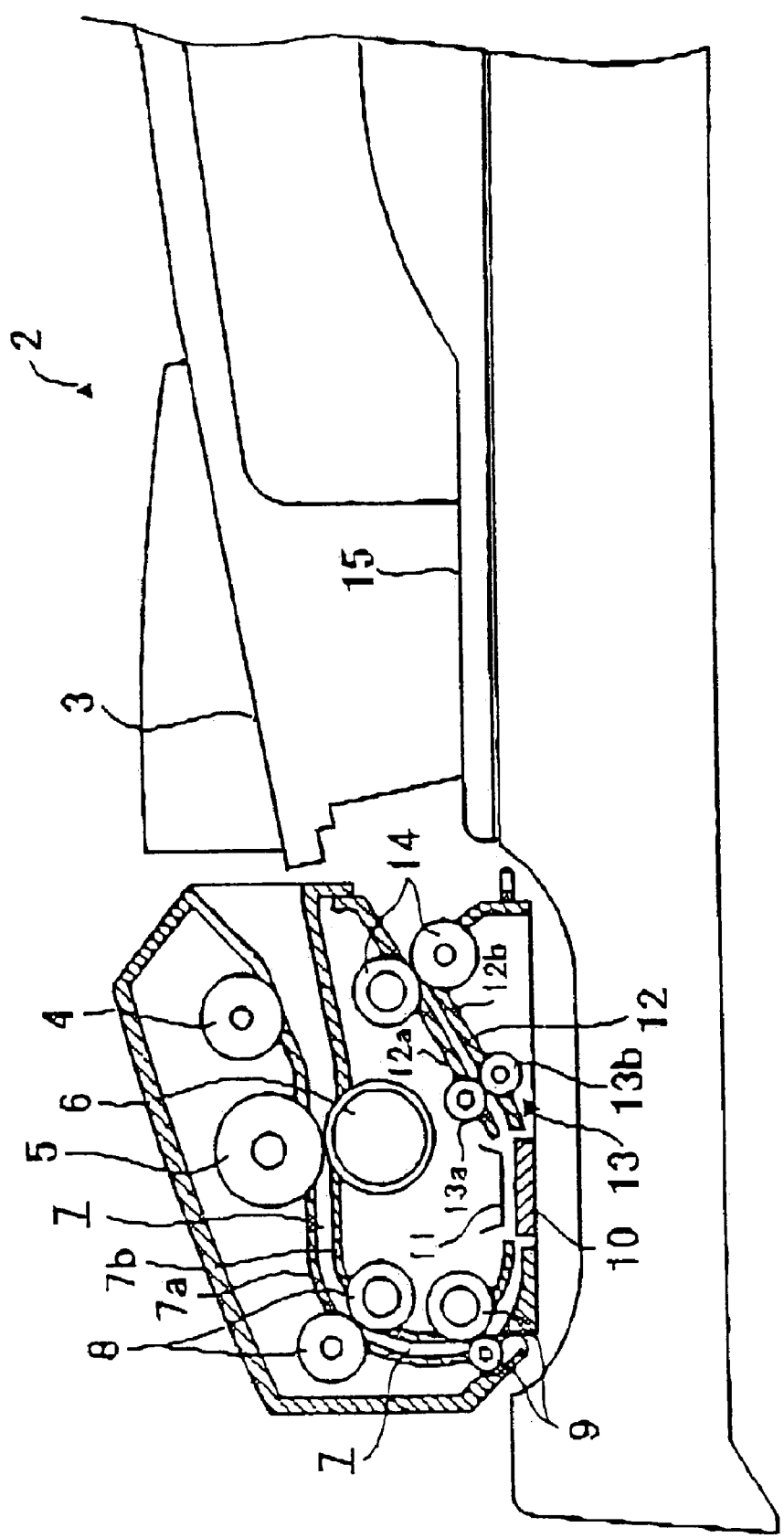
FIG. 3 is a front view of an ADF included in the illustrative embodiment.

Referring to FIGS. 1 through 5, an image reading device embodying the present invention is shown and may be implemented as a copier, a facsimile apparatus or a scanner by way of example. As shown in FIGS. 2 and 3, an ADF 2 is positioned in the upper portion of an image reading device 1 and includes a feed tray 3 on which a plurality of documents, not shown, can be stacked. When a pickup roller 4 is brought into contact with the top of the document stack and rotated, the former pays out the latter from the feed tray 3. Subsequently, the document stack is brought into contact with a feed roller 5 rotating counterclockwise, as viewed in FIG. 2. The feed roller 5 and a reverse roller 6, rotating clockwise in contact with the feed roller 5, cooperate to separate the top document from the underlying documents. The document thus separated by the feed roller 5 and reverse roller 6 is conveyed toward a roller pair 8 via a path 7 formed between guide plates 7a and 7b. The roller pair 8 conveys the document along the path 7.

Further, a roller pair 9, positioned downstream of the roller pair 8 in the direction of conveyance, conveys the document toward a contact type of color image sensor or reading member 10. The color image sensor 10 reads the image of the document. The color image sensor may be replaced with a monochromatic image sensor, if desired.

A shading correcting member 11 is positioned above the image sensor 10 and plays the role of a white reference plate. The shading correcting member 11 and image sensor 10 face each other via a gap selected to be the maximum document thickness plus a, which may be about 0.5 mm. A pair of guide plates 12a and 12b are positioned downstream of the image sensor 10 in the direction of conveyance, forming a path or outlet path 12 therebetween. The path 12 is linearly inclined away from the image sensor 10 toward a discharge tray 15 although it may be curved.

A roller pair 13 is positioned on the path 12 and made up of a rubber roller 13a and a resin roller 13b held in contact with the lower portion of the rubber roller 13a. The nip between the rubber roller 13a and resin lower 13b is positioned above the top of the image sensor 10. In the illustrative embodiment, the rubber roller 13a is operatively connected to a drive source, not shown, because it has a greater coefficient of friction and therefore exerts a greater conveying force than the resin roller 13b. The rollers 13a and 13b both may be connected to the drive source, if desired. The resin roller 13b is formed of polycarbonate or ABS (Acrylonitrile-Butadiene-Styrene) resin by way of example.

An outlet roller pair 14 is positioned downstream of the roller pair 13 in the direction of conveyance. The outlet roller pair 14 nips a document being conveyed along the path 12 and discharges it to a discharge tray 15, which is positioned below the feed tray 3.

Figure 4:
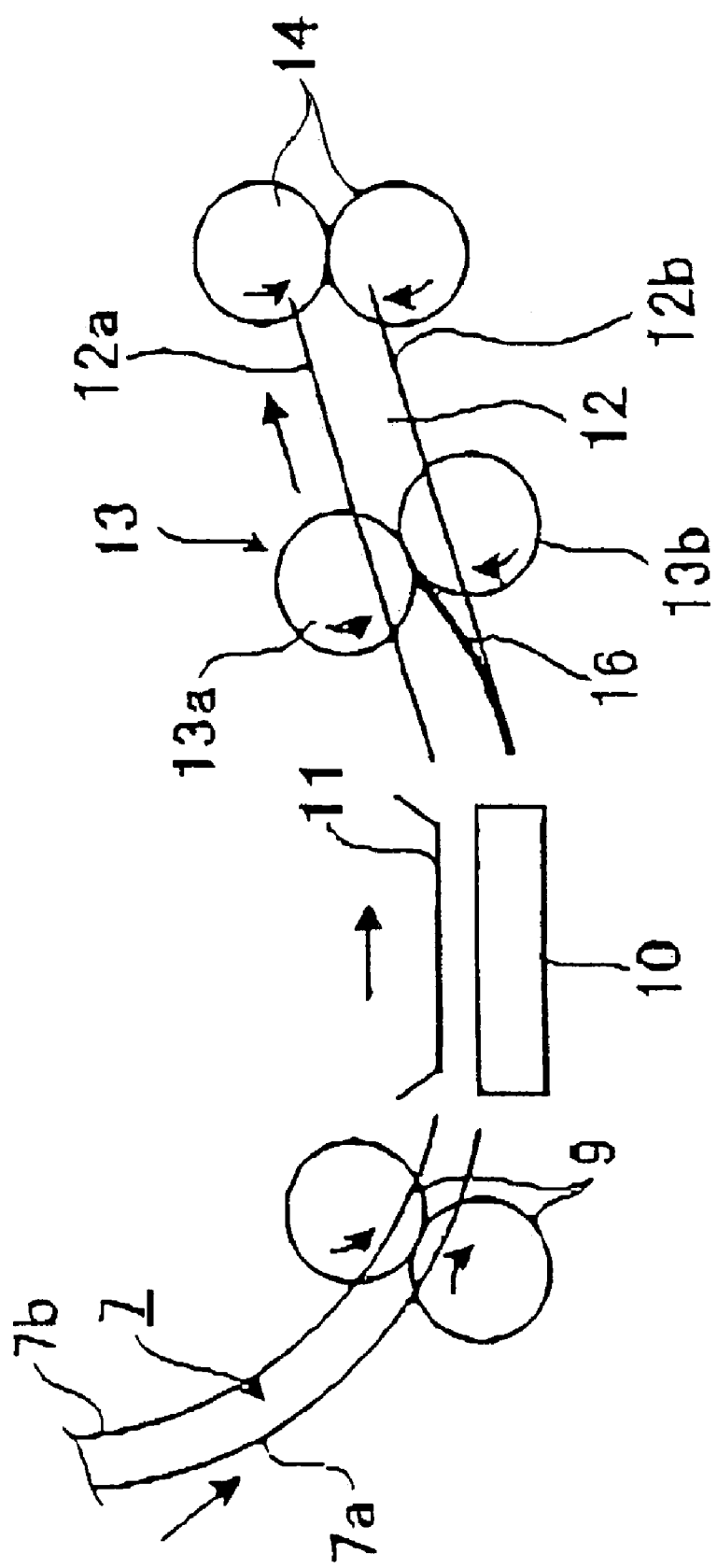
FIG. 4 is a fragmentary front view of a conveying mechanism included in the illustrative embodiment.

As shown in FIG. 4, a Mylar sheet or auxiliary sheet member 16 is positioned on the path 12 between the image sensor 10 and the roller pair 13. One end of the Mylar sheet 16 is affixed to a guide plate 12b at a level lower than the top of the image sensor 10. This can be easily done by use of, e.g., adhesive or a two-sided adhesive tape. The other end of the Mylar sheet 16 is held in contact with the resin roller 13b in the vicinity of the nip between the resin roller 13b and the rubber roller 13a. In FIG. 4, the rollers 9, 13 and 14 each are rotated in a direction indicated by an arrow, conveying a document from the left to the right.

Figure 5:
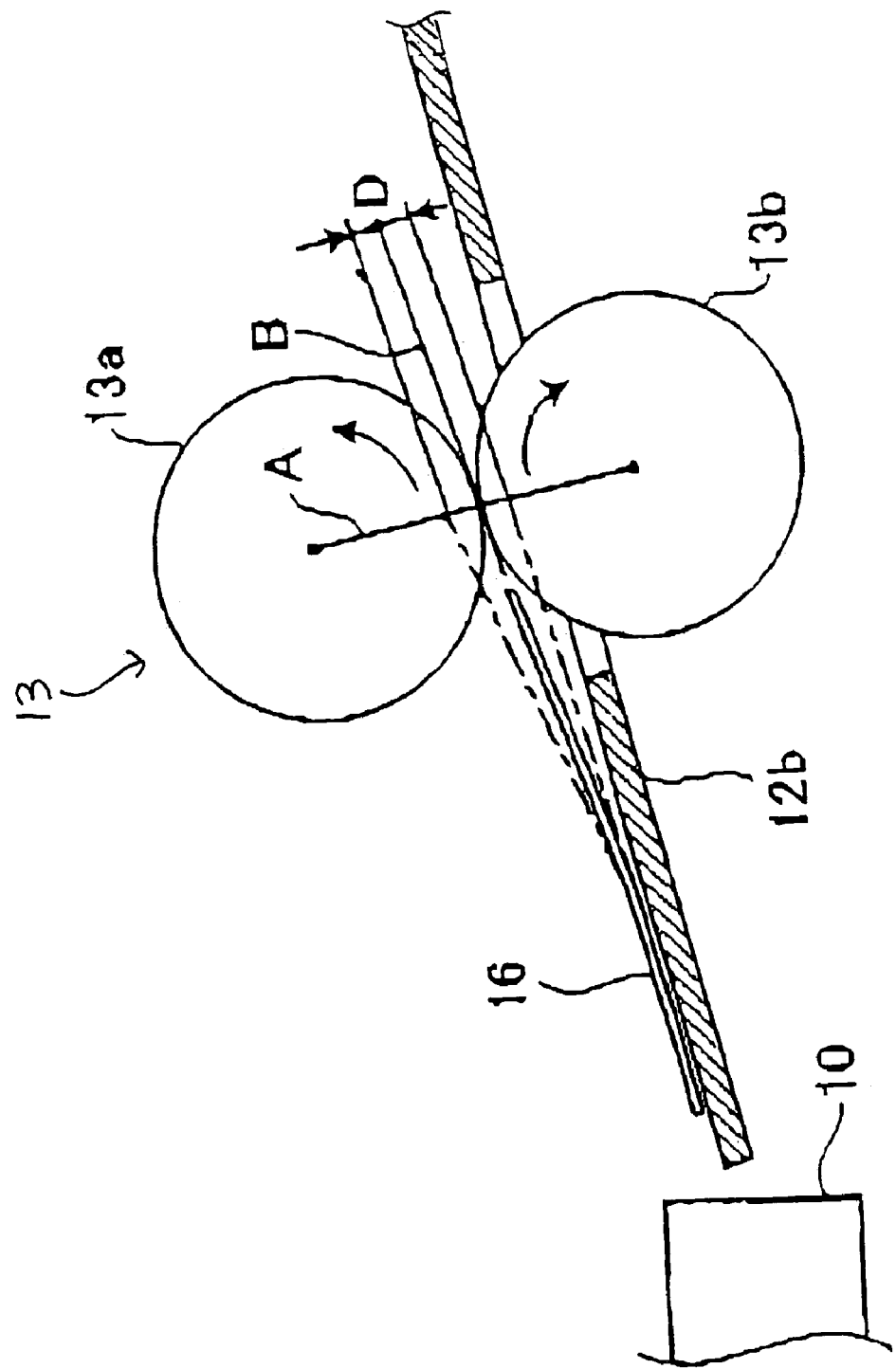
FIG. 5 is a front view showing a positional relation between a roller pair and a Mylar sheet included in the conveying mechanism of FIG. 4.

As shown in FIG. 5, assume a point where a line A virtually connecting the axes of the rollers 13a and 13b and the extension B of the Mylar sheet 16 intersect each other. Then, the intersecting point lies in a range of 1 mm extending from the nip between the rollers 13a and 13b toward the axis of the roller 13a or 13b, i.e., in a range of D which is 2 mm.

Referring again to FIG. 2, the image forming apparatus 1 positioned below the ADF 1 has a body 1a accommodating a sheet cassette 21. A pickup roller 23 pays out a plurality of sheets 22 stacked on the sheet cassette 21 one by one. A group of rollers 24 convey the sheet paid out from the sheet cassette 21 toward a photoconductive drum 26 via a path 25.

A light beam steered by a polygonal mirror 27 scans the surface of the drum 26 in accordance with image data output from the image sensor 10, thereby forming a latent image on the drum 26. A developing unit 28, which includes a developing roller 28a, deposits toner on the latent image to thereby produce a corresponding toner image. An image transfer roller 29 transfers the toner image from the drum 26 to the sheet 22 being conveyed via the nip between the drum 26 and the image transfer roller 29.

Subsequently, a fixing unit 30 positioned above the drum 26 fixes the toner image on the sheet 22. An outlet roller pair 31 conveys the sheet 22 with the fixed toner image to a print tray 32, which is positioned below the ADF 2. A manual feed tray 33 is mounted on the right lower portion of the body 1a.

In the illustrative embodiment, the path 12 is linearly inclined in order to reduce the space to be allocated to the ADF 2. In this case, it is necessary to reduce the gap between the image sensor 10 and the document, so that the image sensor 10 can read the document with accuracy. This, however, increases frictional resistance between the document and the image sensor 10 and thereby reduces the conveying force to act on the document coming out of the image sensor. Particularly, such frictional resistance makes it difficult to convey a soft document.

In light of the above, the roller pair 13 is positioned downstream of the image sensor 10 in order to increase the conveying force. However, the path 12 is inclined upward away from the image sensor 10, so that the nip of the roller pair 13 is positioned above the top of the image sensor 10. In this condition, it is likely that the document fails to reach the nip of the roller pair 13 and jams the path 12 or that the leading edge of the document hits against the resin roller or lower roller 13b and is brought to the nip of the roller pair 13 in a bent position.

In the illustrative embodiment, the Mylar sheet 16 held in the previously stated position promotes the smooth conveyance of the document. More specifically, the document moving away from the image sensor 10 is smoothly delivered to the nip of the roller pair 13 via the Mylar sheet 16 and is therefore free from the problems stated above. Further, the Mylar sheet 16 reduces a shock ascribable to the hit of the document against the roller pair 13, thereby obviating jitter and other defects.

The Mylar sheet 16 and resin roller 13b, contacting each other, both are formed of resin. This obviates an occurrence that the Mylar sheet 16 is sandwiched between the document and the rubber roller 13a and peeled off form the guide plate 12b due to the resulting increase in frictional force. In addition, the rubber roller 13a is prevented from being shaved off due to contact of the rubber roller 13a and Mylar sheet 16, which are formed of different materials.

In the illustrative embodiment, the contact type, color image sensor 10 used as a reading member prevents the document from shaking for thereby obviating, e.g., jitter ascribable to the contact of the document with the roller pair 13. More specifically, the contact type, color image sensor 10 needs reading accuracy several times as high as that of a contact type, monochromatic image sensor. Shock jitter ascribable to the hit of a document against a roller pair is apt to occur in the color image sensor 10 although it may not occur in a monochromatic image sensor. In the illustrative embodiment, despite that use is made of the contact type, color image sensor 10, the Mylar sheet 16 positioned on the path 12 surely guides the document to the nip of the roller pair 13, preventing the document from shaking and therefore obviating jitter and other defects.

In the illustrative embodiment, the point where the virtual line A connecting the axes of the rollers 13a and 13b and the extension B of the Mylar sheet 16 intersect each other lies in the range of 1 mm extending from the nip of the roller pair 13 toward the axis of the roller 13a or 13b. This configuration insures the smooth delivery of the document to the nip of the roller pair 13 for thereby obviating a document jam and the bending of the document more positively, while obviating jitter and other defects more positively.

The Mylar sheet 16 has substantially the same width as the roller pair 13 in the axial direction of the roller pair 13. If the Mylar sheet 16 is wider than the roller pair 13 in the above direction, then the frictional force to act between the document and the Mylar sheet 16 increases to obstruct conveyance. If the Mylar sheet 16 is narrower than the roller pair 13, then the Mylar sheet 16 is apt to warp and prevent the document from entering the nip of the roller pair 13.

Figure 6:
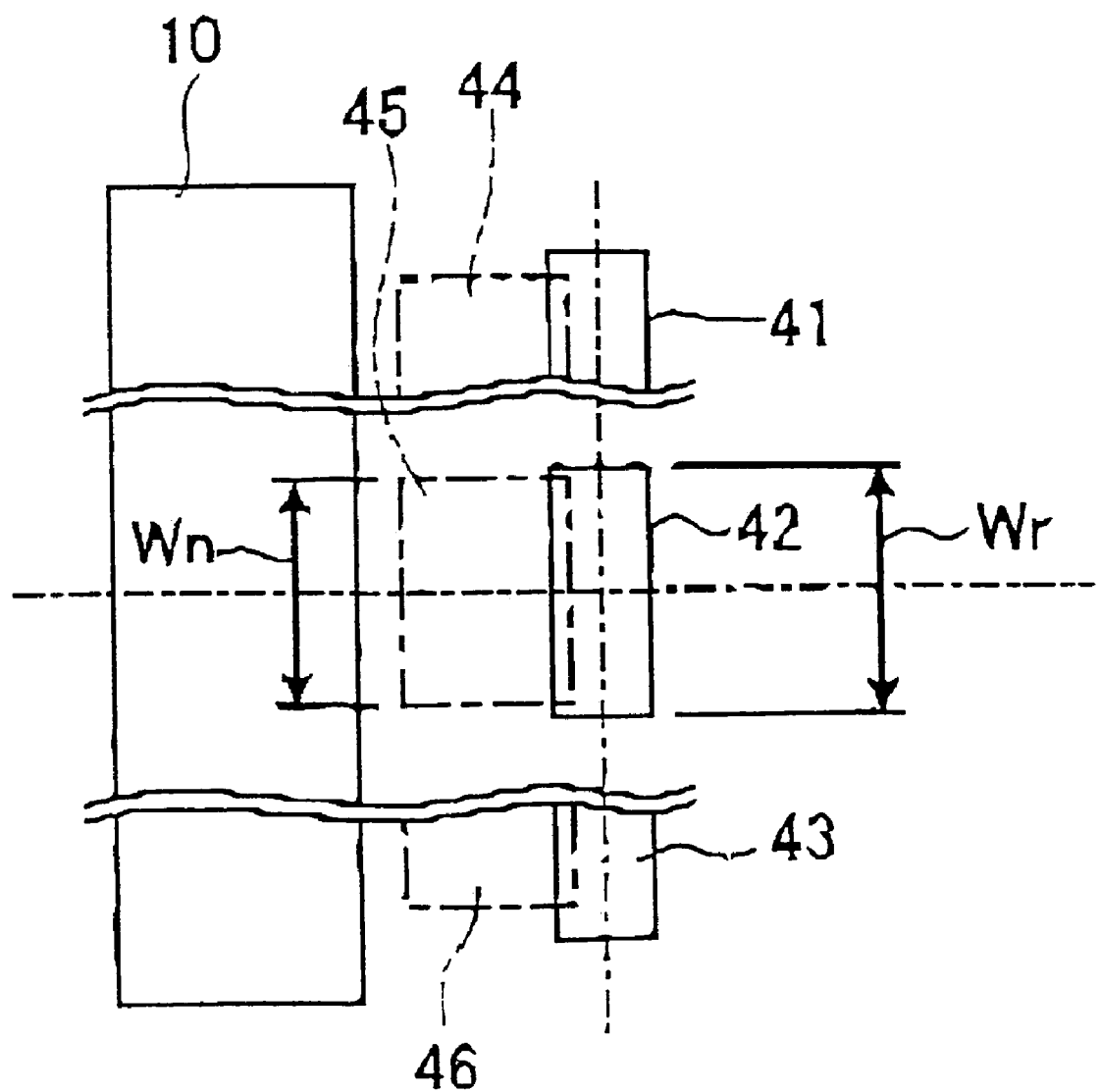
FIG. 6 is a top plan view showing a modification of the illustrative embodiment.

FIG. 6 shows a modification of the illustrative embodiment. As shown, the image reading device includes a plurality of pairs of rollers in place of a single pair of rollers 13 of the illustrative embodiment. More specifically, three roller pairs 41, 42 and 43 are arranged side by side in the direction perpendicular to the direction of conveyance. Mylar sheets 44, 45 and 46 are associated with the roller pairs 41, 42 and 43, respectively. Alternatively, only the Mylar sheet 45 may be assigned to the roller pair 42 located at the center with respect to the maximum document size that can be dealt with by the document reading device. The Mylar sheet 45 can smoothly guide the document to the nips of the roller pairs 41 through 43 alone, and moreover reduces the cost of the document reading device.

The presence of the roller pairs 41 through 43 and Mylar sheets 44 through 46 does not matter at all so long as the conveying force to act on the document is great enough to overcome the increase in frictional force between the document and the Mylar sheets 44 through 46. Again, the Mylar sheets 44 through 46 each have a width Wn substantially the same as the width Wr of each of the roller pairs 41 through 43 associated therewith so as to obviate the undesirable occurrences stated earlier.

The Mylar sheet used in the illustrative embodiment and its modification may be replaced with, e.g., a sheet of stainless steel or phosphor bronze, if desired.

Figure 7:
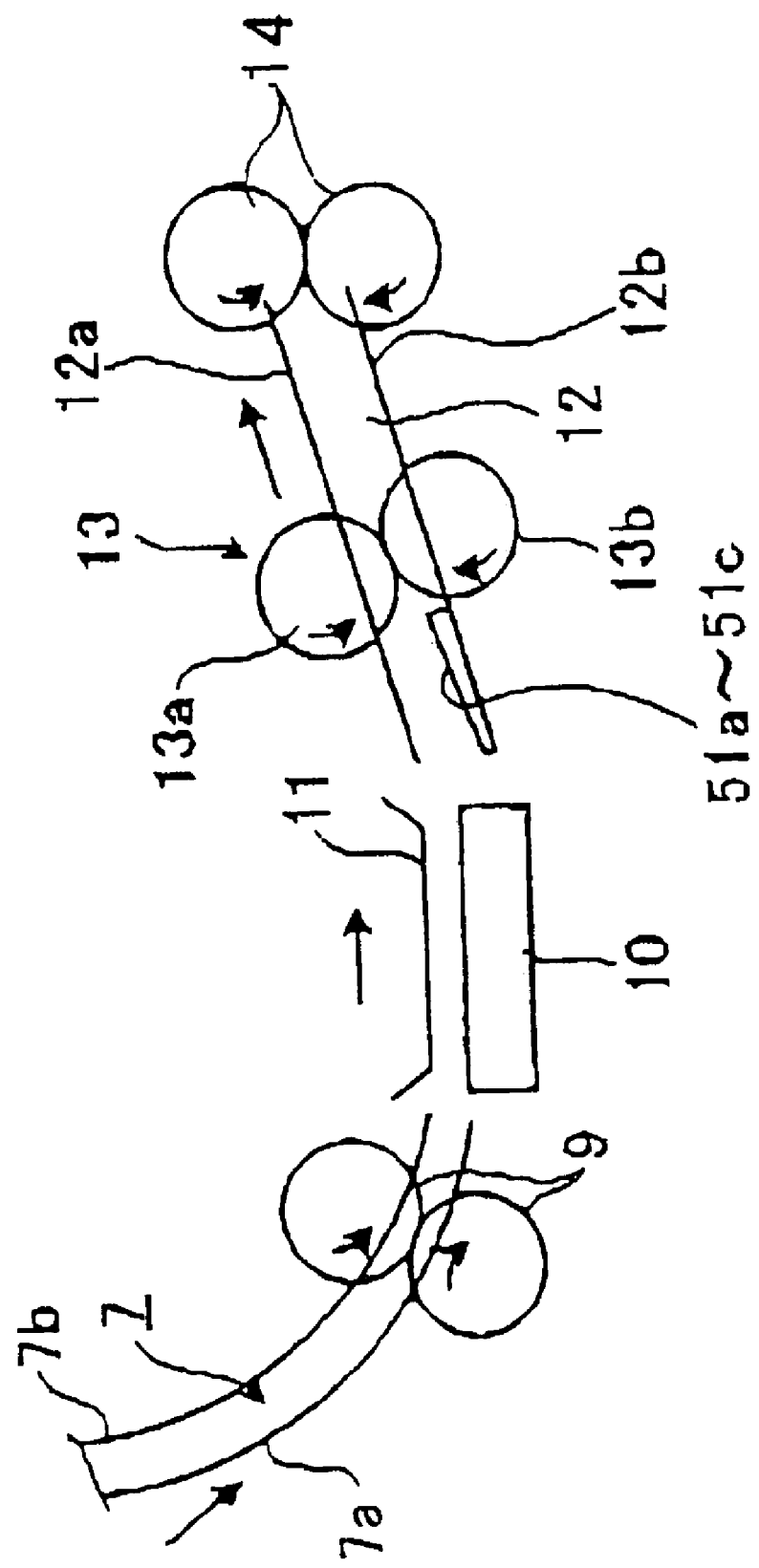
FIG. 7 is a fragmentary front view showing a conveying mechanism representative of an alternative embodiment of the present invention.
Figure 8:
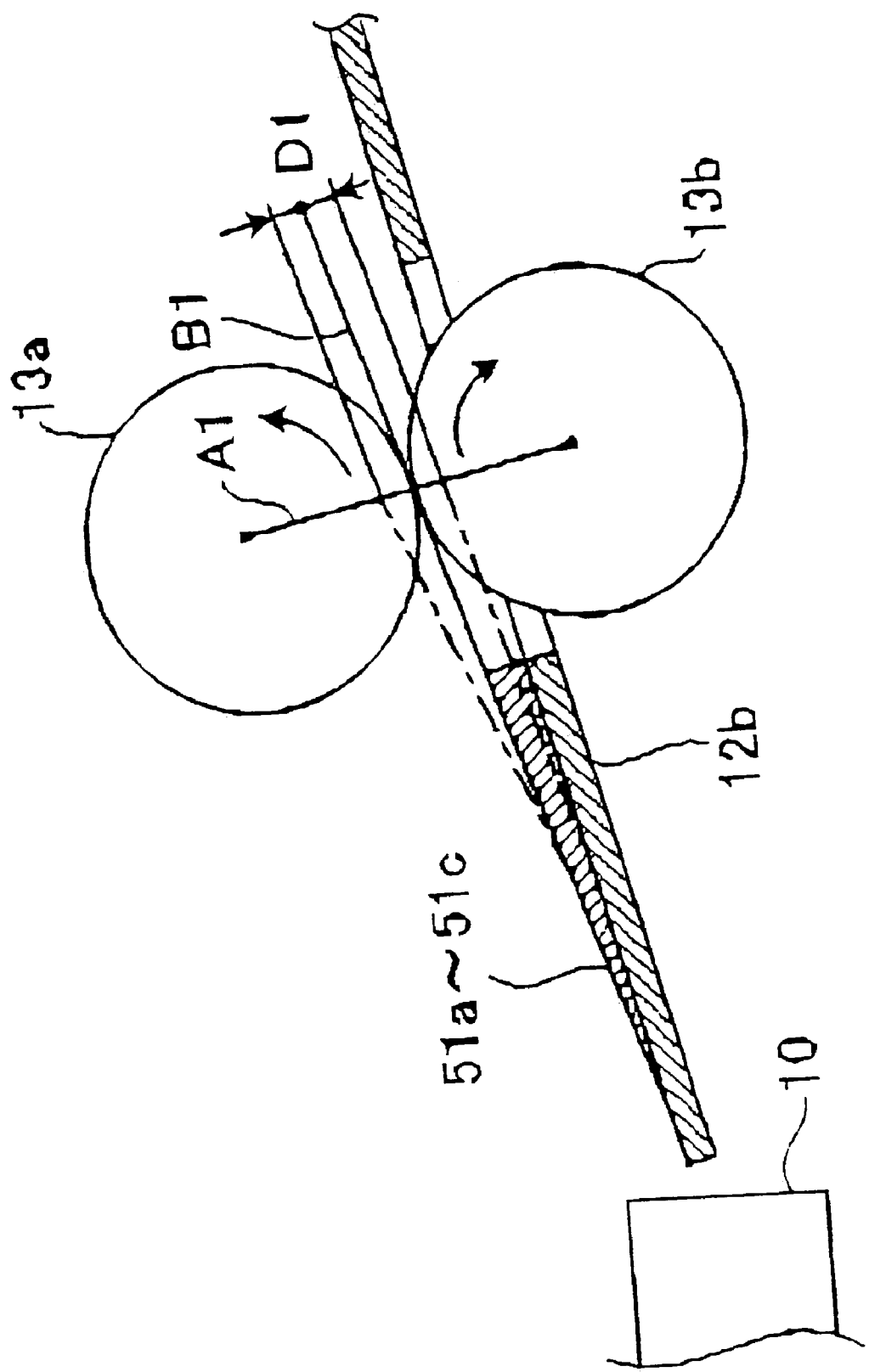
FIG. 8 is a front view showing a positional relation between a roller pair and ribs included in the conveying mechanism of FIG. 7.
Figure 9:
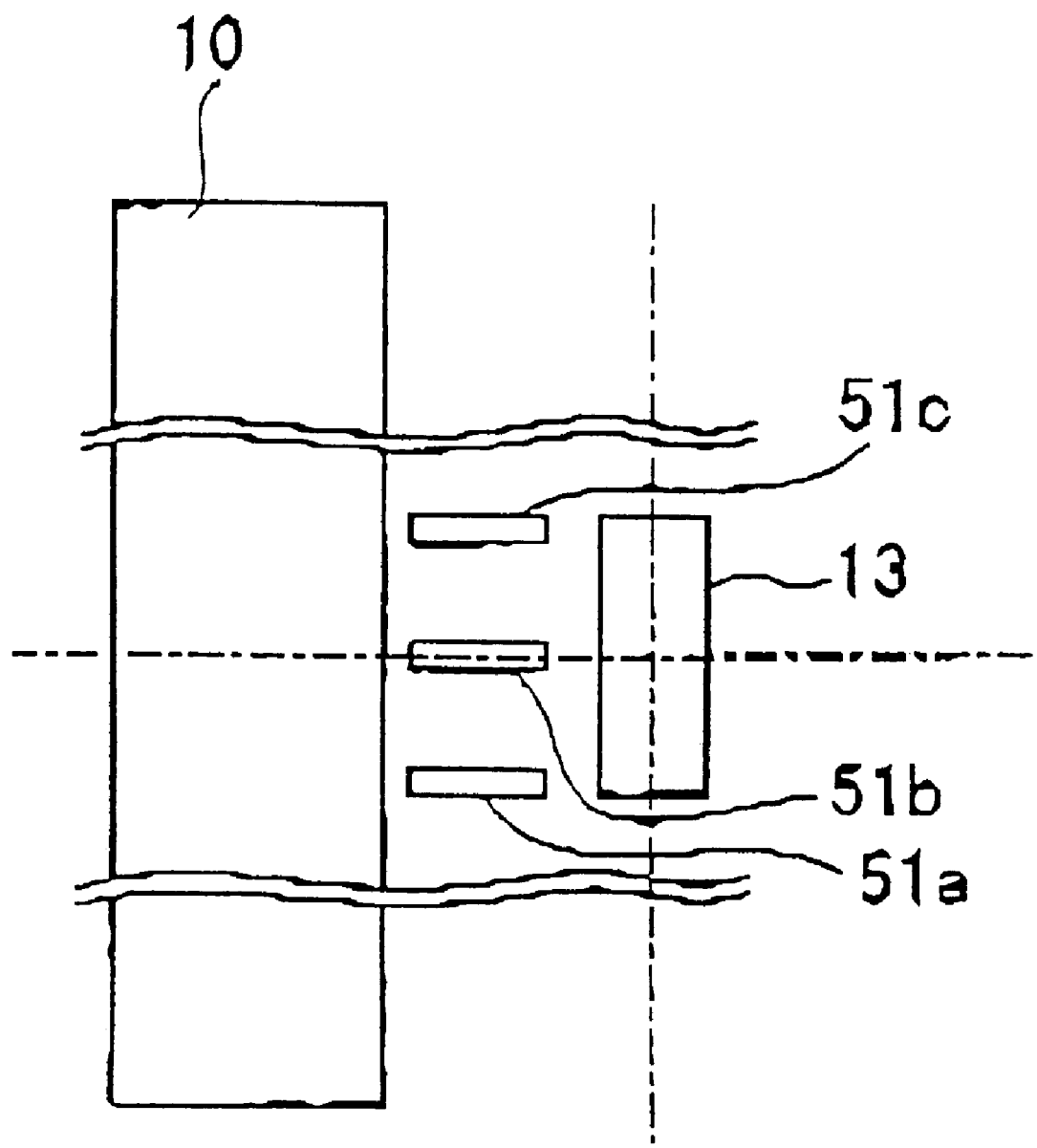
FIG. 9 is a top plan view showing the roller pair and ribs.

Reference will be made to FIGS. 7 through 9 for describing an alternative embodiment of the present invention. The illustrative embodiment is essentially similar to the previous embodiment except for the following. In FIGS. 7 through 9, structural elements identical with the structural elements shown in FIGS. 2 through 6 are designated by identical reference numerals and will not be described specifically in order to avoid redundancy.

As shown in FIGS. 7 through 9, three ribs 51a, 51b and 51c are positioned on the path 12. One end of each of the ribs 51a through 51c is located in the vicinity of the image sensor 10 below the top of the image sensor 10. The other end of each of the ribs 51a through 51c adjoins the nip of the roller pair 13. In this configuration, the ribs 51a through 51c smoothly guide the document moving away from the image sensor 10 to the nip of the roller pair 13 over the ribs 51a through 51c, thereby obviating a document jam and the bending of the leading edge portion of the document. In addition, the ribs 51a through 51b reduce a shock ascribable to the hit of the document against the roller pair 13 for thereby obviating jitter and other defects.

As shown in FIG. 8, the point where the virtual line A1 connecting the axes of the rollers 13a and 13b and the extension B of each of the ribs 51a through 51c 16 intersect each other lies in the range of 1 mm extending from the nip of the roller pair 13 toward the axis of the roller 13a or 13b, i.e., the range of D1 which is 2 mm. This configuration insures the smooth delivery of the document to the nip of the roller pair 13 for thereby obviating a document jam and the bending of the document more positively, while obviating jitter and other defects more positively.

The ribs 51a and 51c, positioned at opposite sides in the direction perpendicular to the direction of conveyance, are spaced from each other by a distance substantially equal to the width of the roller pair 13 in the axial direction of the roller pair 13. The document can therefore be smoothly guided to the nip of the roller pair 13.

Figure 10:
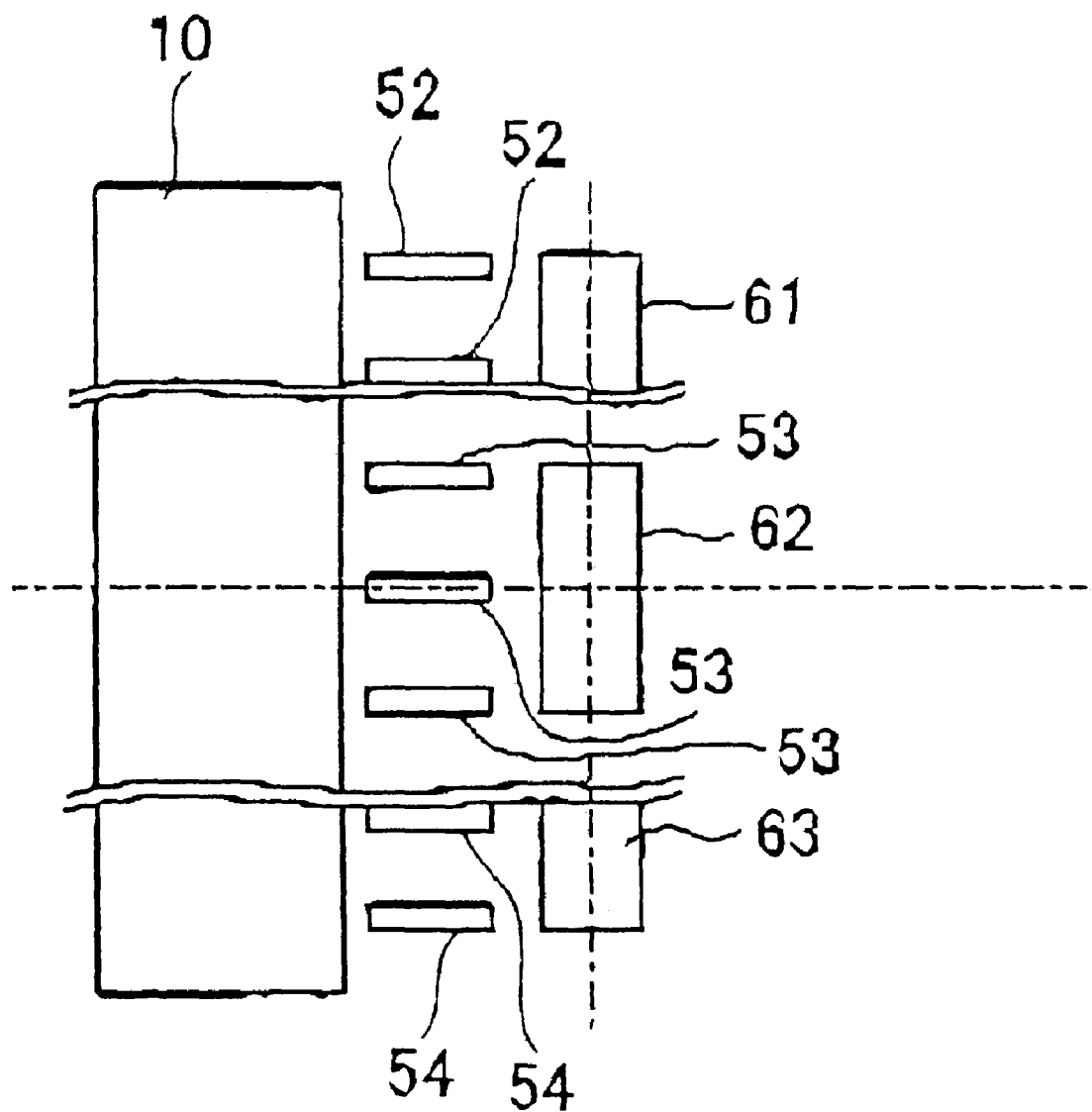
FIG. 10 is a top plan view showing a modification of the alternative embodiment.

FIG. 10 shows a modification of the illustrative embodiment. As shown, the image reading device includes a plurality of pairs of rollers in place of a single pair of rollers 13 of the illustrative embodiment. More specifically, three roller pairs 61, 62 and 63 are arranged side by side in the direction perpendicular to the direction of conveyance. Three ribs 52, three ribs 53 and three ribs 54 are associated with the roller pairs 61, 62 and 63, respectively. Alternatively, only the ribs 53 may be assigned to the roller pair 62 located at the center with respect to the maximum document size that can be dealt with by the document reading device. The ribs 53 can smoothly guide the document to the nips of the roller pairs 61 through 63 alone, and moreover reduces the cost of the document reading device.

Figure 11:
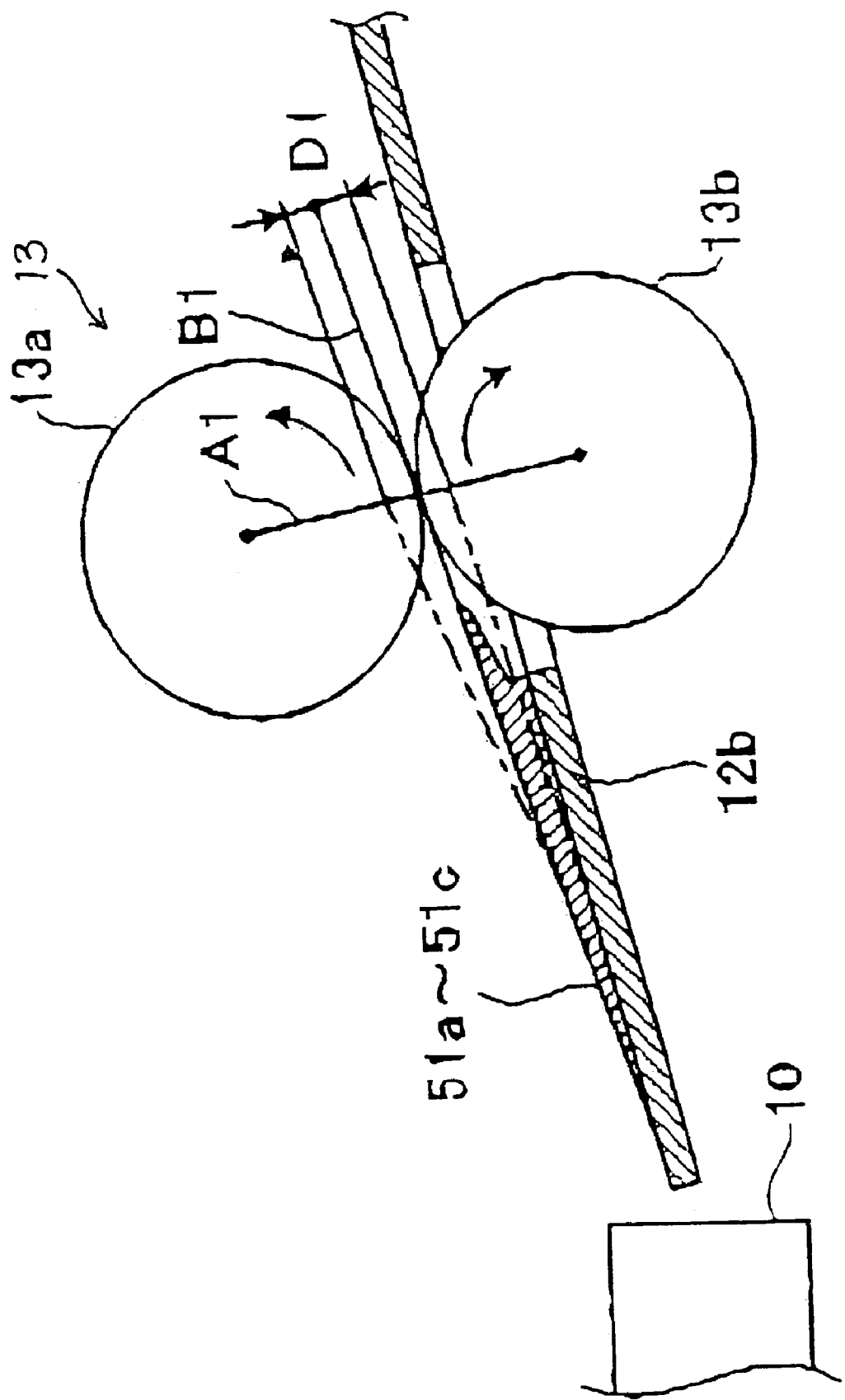
FIG. 11 is a front view showing another modification of the alternative embodiment.

As shown in FIG. 11, the ribs 51a through 51c each may be extended such that its leading edge is positioned in the vicinity of the nip of the roller pair 13. This configuration further insures the smooth delivery of the document to the nip of the roller pair 13 over the ribs 51a through. 51c.

While the path 12 is linearly inclined in the illustrative embodiments shown and described, it may extend in the horizontal direction. Even with the horizontal path 12, the various advantages stated earlier are achievable if the Mylar sheet or the ribs are held in the same relation to the roller pair and image sensor as in the illustrative embodiment.

In summary, it will be seen that the present invention provides an image reading device capable of smoothly delivering a document read to the nip of a roller pair via an auxiliary sheet member or ribs, thereby obviating a jam and protecting the leading edge portion of the document from bending. Further, the image reading device of the present invention reduces a shock ascribable to the hit of the document against the roller pair to thereby obviate jitter and other defects.

Various modifications will become possible for those skilled in the art after receiving the teachings of the present disclosure without departing from the scope thereof.

What is claimed is:

1. An image reading device for reacting an image of a document while conveying said document, said image reading device comprising:
   a reading member configured to read the image of the document;
   a path member positioned downstream of said reading member in a direction of a document conveyance such that the document moving away from said reading member is conveyed along said path member;
   a pair of rollers positioned on said path member and configured to nip and convey the document and having a nip positioned above a top of said reading member; and an auxiliary sheet member positioned on said path member between said reading member and said pair of rollers for conveying the document to said nip;

wherein one end of said auxiliary sheet member is affixed to said path member and is adjacent to said reading member at a position lower than a top of said reading member while the other end of said auxiliary sheet member is held in contact with part of said pair of roller around the nip;

wherein when said pair of rollers comprise a plurality of pairs of rollers arranged side by side in a direction perpendicular to the direction of document conveyance, said auxiliary sheet member is associated with at least one of said plurality of pairs of rollers located at a center of a maximum document width that can be dealt with by said device.

2. The device as claimed in claim 1, wherein said auxiliary sheet member has substantially a same width as said pair of rollers.

3. The device as claimed in claim 1, wherein a point, determined by an intersection of a line connecting axes of said pair of rollers and an extension of said auxiliary sheet member, lies in a range of 1 mm extending from the nip toward an axis of either one of said pair of rollers.

4. The device as claimed in claim 3, wherein said pair of rollers comprise a plurality of pairs of rollers arranged side by side in a direction perpendicular to the direction of document conveyance, and said auxiliary sheet member is associated with at least one of said plurality of pairs of rollers located at a center of a maximum document width that can be dealt with by said device.

5. The device as claimed in claim 4, wherein said auxiliary sheet member has substantially a same width as said pair of rollers.

6. The device as claimed in claim 1, wherein said pair of rollers respectively comprise a rubber roller and a resin roller contacting a lower portion of said rubber roller, and the other end of said auxiliary sheet member is held in contact with said resin roller.

7. The device as claimed in claim 6, wherein a point, determined by an intersection of a line connecting axes of said pair of rollers and an extension of said auxiliary sheet member, lies in a range of 1 mm extending from the nip toward an axis of either one of said pair of rollers.

8. The device as claimed in claim 7, wherein said pair of rollers comprise a plurality of pairs of rollers arranged side by side in a direction perpendicular to the direction of document conveyance, and auxiliary sheet member is associated with at least one of said plurality of pairs of rollers located at a center of a maximum document width that can be dealt with by said device.

9. The device as claimed in claim 8, wherein said auxiliary sheet member has substantially a same width as said pair of rollers.

10. An image reading device for reading an image of a document while conveying said document, said image reading device comprising:

a reading member configured to read the image of the document;

a path member positioned downstream of said reading member in a direction of a document conveyance such that the document moving away from said reading member is conveyed along said path member;

a pair of rollers positioned on said path member and configured to nip and convey the document and having a nip positioned above a top of said reading member; and at least two ribs positioned on said path member between said reading member and said pair of rollers for conveying the document;

wherein one end of each of said at least two ribs is positioned on said path member adjacent said reading member at a position lower than a top of said reading member while the other end of each of said at least two ribs is positioned adjacent to a part of said pair of rollers around the nip.

11. The device as claimed in claim 10, wherein said at least two ribs are positioned at both sides in a direction perpendicular to the direction of document conveyance and are spaced from each other by a distance equal to a width of said pair of rollers.

12. The device as claimed in claim 10, wherein said pair of rollers comprise a plurality of pairs of rollers arranged side by side in a direction perpendicular to the direction of document conveyance, and each of the said at least two ribs is associated with at least one of said plurality of pairs of rollers located at a center of a maximum document width that can be dealt with by said device.

13. The device as claimed in claim 12, wherein said at least two ribs are positioned at both sides in a direction perpendicular to the direction of document conveyance and are spaced from each other by a distance equal to a width of said pair of rollers.

14. The device as claimed in claim 10, wherein a point, determined by an intersection of a line connecting axes of said pair of rollers and an extension of said at least two ribs, lies in a range of 1 mm extending from the nip toward an axis of either one of said pair of rollers.

15. The device as claimed in claim 14, wherein said pair of rollers comprise a plurality of pairs of rollers arranged side by side in a direction perpendicular to the direction of document conveyance, and each of the said at least two ribs is associated with at least one of said plurality of pairs of rollers located at a center of a maximum document width that can be dealt with by said device.

16. The device as claimed in claim 15, wherein said at least two ribs are positioned at both sides in a direction perpendicular to the direction of document conveyance and are spaced from each other by a distance equal to a width of said pair of rollers.

* * * * *